United States Patent [19]

Iwahashi

[11] Patent Number: 4,908,725
[45] Date of Patent: Mar. 13, 1990

[54] RECORDING MEDIUM CASING WITH ERASE PREVENTION DEVICE

[75] Inventor: Yuuji Iwahashi, Miyagi, Japan

[73] Assignee: Sony Corporation, Tokyo, Japan

[21] Appl. No.: 243,202

[22] Filed: Sep. 8, 1988

Related U.S. Application Data

[63] Continuation of Ser. No. 907,810, Sep. 16, 1986, abandoned.

[30] Foreign Application Priority Data

Oct. 14, 1985 [JP] Japan .................................. 60-157252

[51] Int. Cl.$^4$ .............................................. G11B 15/04
[52] U.S. Cl. ........................................ 360/132; 360/60
[58] Field of Search ........................ 360/60, 132, 137; 242/197–199

[56] References Cited

U.S. PATENT DOCUMENTS

| 4,012,011 | 3/1977 | Saito | 360/132 |
| 4,041,537 | 8/1977 | Kishi | 360/60 |
| 4,044,386 | 8/1977 | Satou et al. | 360/132 X |
| 4,460,930 | 7/1984 | Takahashi | 360/132 X |
| 4,507,692 | 3/1985 | Sasaki | 360/60 |

FOREIGN PATENT DOCUMENTS 0218085 12/1983 Japan .

Primary Examiner—Stuart N. Hecker
Assistant Examiner—David J. Severin
Attorney, Agent, or Firm—Ronald P. Kananen

[57] ABSTRACT

An erase prevention device for use in a recording medium casing to selectively inhibit recording on a recording medium contained in the recording medium casing when the casing is placed in a recorder. The device comprises coaxial holes formed in the recording medium casing to provide an injection passage. A slider is guided for sliding movement in the recording medium casing between first and second positions. The slider opens the inspection passage in the first position to inhibit recording and closes the inspection passage in the second position to allow recording. An aperture is formed in the recording medium casing for providing a visible indication of the position of the slider. The slider opens the aperture in the first position and closes the aperture in the second position. With this arrangement, the position of the slider is apparent at a glance to prevent mistake.

6 Claims, 5 Drawing Sheets

RECORDING MEDIUM CASING WITH ERASE PREVENTION DEVICE

This application is a continuation, of application Ser. No. 06/907,810, filed Sept. 16, 1986, now abandoned.

BACKGROUND OF THE INVENTION

This invention relates to an erase prevention device for use in a recording medium casing to selectively inhibit recording on the recording medium when the recording medium casing is placed in a recorder/player unit.

Case-mounted erasable recording media, such for example as casette tapes, have been employed widely with recorder/player units for repetitive recording of data thereon. In order to protect a user from making a mistake to erase data necessary to be retained, it is the current practice to provide an erase prevention device at one corner of the recording medium casing. Such an erase prevention device includes coaxial holes formed in the recording medium casing for insertion of an inspection probe from a recorder/player unit to inhibit operation of the recorder/player unit in a recording mode when the recording medium casing is placed in the recorder/player unit. The erase prevention device also includes a slider placed in the recording medium casing for sliding movement between two positions. The slider opens the coaxial holes in the first position and closes the coaxial holes in the second position. An aperture is formed in the recording medium casing to provide a visual indication of the slider. The slider closes the aperture and it can be viewed through the aperture when it occupies the first position.

With such a conventional an erase prevention device, however, the user would consider, by mistake, from a glance of one of the coaxial holes that the recording medium is allowed for use in recording data when the slider opens the coaxial holes and that the recording medium is inhibited for use in recording data when the slider closes the coaxial holes.

SUMMARY OF THE INVENTION

There is provided, in accordance with the invention, an erase prevention device for use in a recording medium casing to selectively inhibit recording on a recording medium contained in the recording medium casing placed in a recorder. The device comprises coaxial holes formed in the recording medium casing to provide an inspection passage. A slider is guided for sliding movement in the recording medium casing between first and second positions. The slider opens the coaxial holes to open the inspection passage so as to inhibit operation of the recorder in a recording mode when the slider is in the first position. The slider closes the coaxial holes to interrupt the inspection passage so as to allow operation of the recorder in a recording mode when the slider is in the second position. An aperture is formed in the recording medium casing for providing a visible indication of the position of the slider. The slider opens the aperture in the first position and closes the aperture in the second position.

Therefore, the invention provides an improved erase prevention device capable of minimizing the possibility of a user from mistaking the position of the slider at a glance of the hole.

BRIEF DESCRIPTION OF THE DRAWINGS

The present invention will be described in greater detail by reference to the following description taken in connection with the accompanying drawings, in which.

DETAILED DESCRIPTION OF THE PREFERRED EMBODIMENT

Prior to the description of the preferred embodiment of the invention, the prior art erase prevention device of FIGS. 1 to 5 is briefly described in order to provide a basis for a better understanding of the difficulties attendant therewith.

Figure 1:
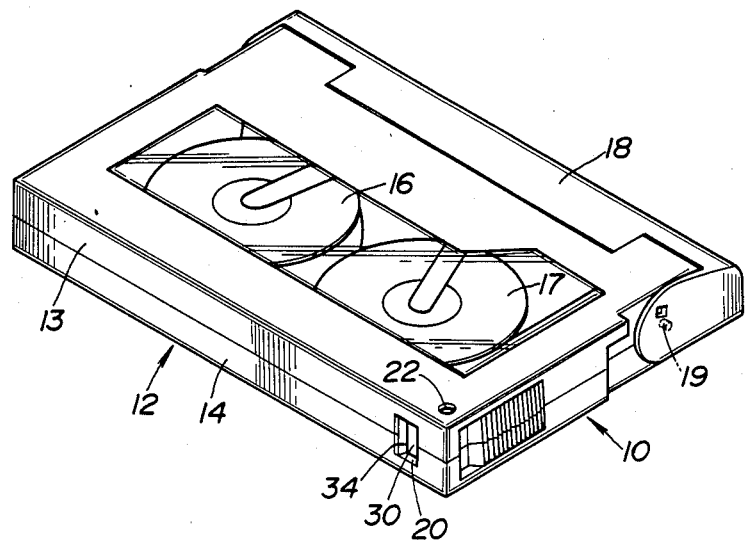
FIG. 1 is a perspective view of a tape cassette provided with a conventional erase prevention device.

Referring to FIG. 1, the tape cassette, designated generally by the numeral 10, includes a casing 12 which comprises upper and lower halves 13 and 14 bolted to each other and contains a pair of tape reels 16 and 17. A front cover 18 is pivoted at 19 on the opposite side surfaces of the casing 12 for covering the front end of the casing 12 to provide effective protection for the guide members (not shown) for guiding the magnetic tape. A rectangular aperture 20 is formed in the rear end surface of the casing 12 near one side edge thereof. Provided at one corner of the tape cassette 10 is an erase prevention device which comprises a slider 30 placed for sliding movement within a slider chamber between two positions. The first position, illustrated in FIG. 1, results in the slider 30 closing the aperture 20. In FIG. 1, the slider 30 is viewed through the rectangular aperture 20 with its actuating protrusion 34 being positioned in abutment with one side edge of the rectangular aperture 20. In the second position, the slider 30 opens the aperture 20. The actuating protrusion 34 is used in sliding the slider 30 between the first and second positions. The casing 12 is provided in its upper surface with a hole 22.

Figure 2:
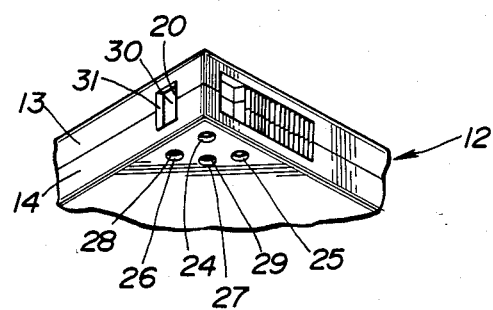
FIG. 2 is a fragmentary perspective view showing the conventional erase prevention device.

As shown in FIG. 2, the casing 12 is also provided in its lower surface with holes 24, 25, 26 and 27. The hole 24 is in axial alignment with the hole 22 to provide an inspection passage for insertion of an inspection probe used in making a determination as to whether the slider 30 is at the first or second position when the tape cassette 10 is placed in a video tape recorder/player unit. The hole 25 is for insertion of a positioning pin to positioning the tape cassette 10 in place within the video tape recorder/player unit. The holes 26 and 27 are closed with respective thin films 28 and 29, each of which can be removed from the corresponding hole merely by insertion of a pin therethrough. The presence or absence of each of the thin films 28 and 29 constitutes predetermined information for the video tape recorder/player unit.

Figure 3:
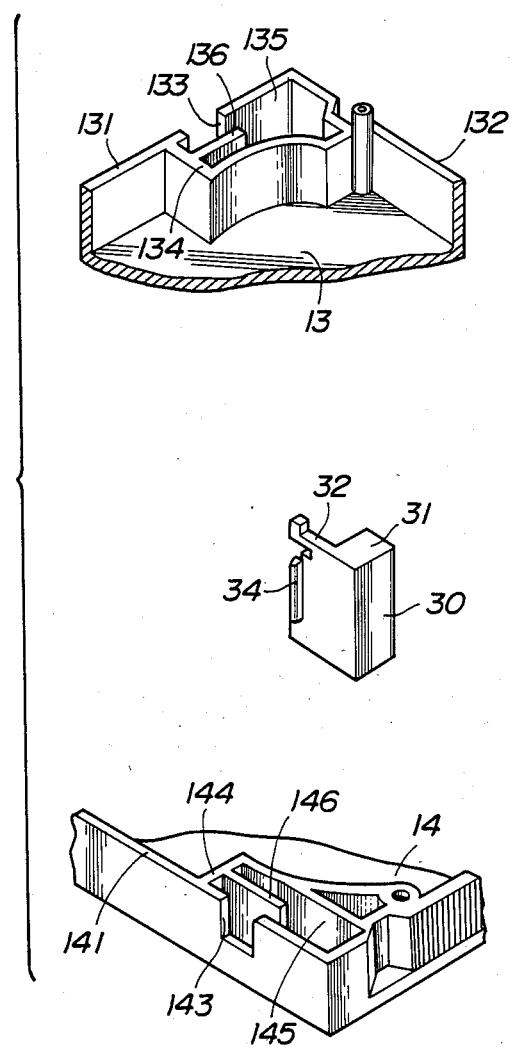
FIG. 3 is an exploded view showing the conventional erase prevention device with the upper half shown in an upside-down position.

Referring to FIG. 3, the upper half 13 has a cutout 133 formed in the rear wall 131 thereof. The upper half 13 also has an inner wall 134 extending in a manner to define a recess 135 together with the rear and side walls 131 and 132 thereof. A guide wall 136 extends into the recess 135 from the inner wall 134, in parallel with the rear wall 131, a length overlapping the cutout 133. Similarly, the lower half 14 has a cutout 143 formed in the rear wall 141 thereof and an inner wall 144 extending in a manner to define a recess 145 together with the rear and side walls 141 and 142 thereof. A guide wall 146 extends into the recess 145 from the inner wall 144, in parallel with the rear wall 141, a length overlapping the cutout 143. The cutouts 133 and 143 comes into registry with each other to form the aperture 20, the inner walls 134 and 144 come into abutment with each other to form a partition wall defining the slider chamber, and the guide walls 136 and 146 come into abutment with each other to form a slider guide when the upper and lower half 13 and 14 are assembled together to form the casing 12.

The slider 30 has a substantially L-shaped cross-sectional configuration having a large-width portion 31 on its rear side and a small-width portion 32 on its front side. The slider 30 has a color different from that of the casing 12. Only for the sake of clarity of explanation, description will be made to the casing 12 as having a gray color and to the slider 30 as having a red color. The slider 30 is placed for sliding movement within the slider chamber between first and second positions by the aid of the slider guide which is in sliding contact with the inner surface of the small-width portion 32 of the slider 30. The stroke of sliding movement of the slider 30 is substantially equal to the width of the aperture 20. In this first position, the slider 30 closes the aperture 20 with its outer side surface 33 so that the red-colored slider 30 is viewed through the aperture 20. In the second position, the slider 30 is retired from the aperture 20 so that the gray-colored slider guide is viewed through the aperture 20. The actuating protrusion 34 extends outward through the aperture 20 from the side surface 33 of the slider 30 near the front edge of the small-width portion 32.

Figure 4A:
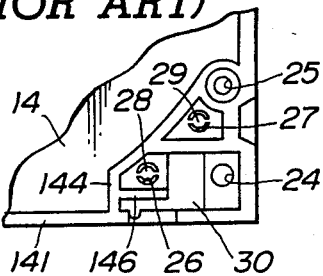
FIGS. 4A, 4B, and 4C contain three fragmentary views showing the conventional erase prevention device as viewed in different directions with the slider being in the first position.
Figure 4B:
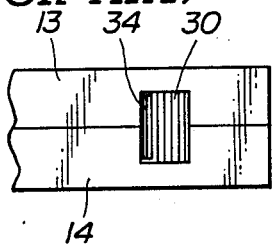
Figure 4C:
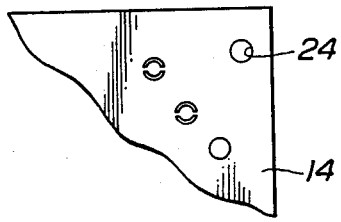

When the slider 30 is in the first position, as shown in FIG. 4A, the slider 30 closes the aperture 20, as shown in FIG. 4B, and the slider 30 opens the coaxial holes 22 and 24, as shown in FIG. 4C, to inhibit operation of the video tape recorder/player unit in a recording mode. Therefore, the red-colored slider 30 is viewed through the aperture 20, whereas the red-colored slider 30 cannot be viewed through the hole 22 or 24. Under this circumstance, the user would consider, by mistake, at a glance of the hole 22 or 24 that the cassette tape is allowed for use in recording.

Figure 5A:
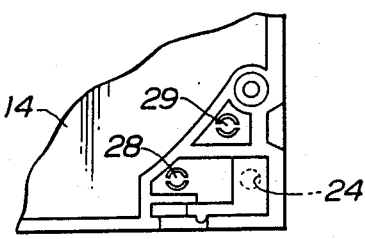
FIGS. 5A, 5B, and 5C contain three fragmentary views showing the conventional erase prevention device as viewed in different directions with the slider being in the second position.
Figure 5B:
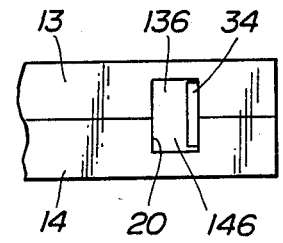
Figure 5C:
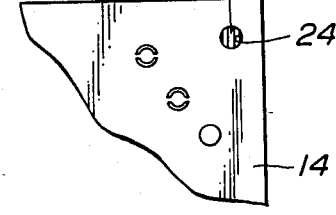

When the slider 30 is in the second position, as shown in FIG. 5A, the slider 30 opens the aperture 20, as shown in FIG. 5B, and the slider 30 closes the coaxial holes 22 and 24, as shown in FIG. 5C, to allow operation of the video tape recorder/player unit in a recording mode. Therefore, the red-colored slider 30 cannot be viewed through the aperture 20, whereas the red-colored slider 30 is viewed through the hole 22 or 24. Under this circumstance, the user would consider, by mistake, at a glance of the hole 22 or 24 that the cassette tape is inhibited for use in recording.

Figure 6:
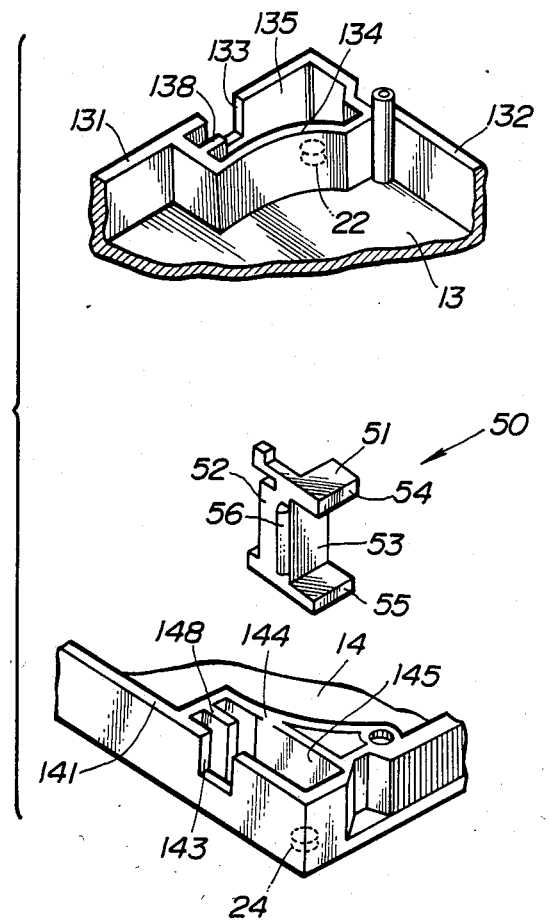
FIG. 6 is a fragmentary exploded view showing one embodiment of an erase prevention device made in accordance with the invention with the upper half shown in an upside-down position.

Referring now to FIG. 6, there is illustrated one embodiment of an erase prevention device embodying the invention. The arrangement of FIG. 6 utilizes a number of the components previously described, and like numerals in FIG. 6 indicate like parts as described with reference to FIG. 3. While in the exemplification of the invention, the recording rejection device will be described for use in conjunction with a video tape, it will be appreciated that the recording rejection device of the invention is also equally applicable to numerous types of recording media.

In this embodiment, the slider guide is comprised of guide walls 138 and 148 and it extends into the slider chamber a length smaller than the slider guide comprised of the guide walls 133 and 144 shown in FIG. 3. The reference numeral 50 designates a slider having a substantially L-shaped plane configuration having a large-width portion 51 on its rear side and a small-width portion 52 on its front side. The large-width portion 51 is formed with a cutout 53 to provide upper and lower franges 54 and 55 facing to each other. The cutout 53 extends the full width of the slider in a direction substantially parallel to the axis of the aperture 20 and has a depth somewhat shorter than the whole length of the large-width portion 51. The small-width portion 52 has an actuating protrusion 56 formed on its outer surface near the rear edge thereof. The slider 50 is placed for sliding movement within the slider chamber between first and second positions with its small-width portion 52 being held between the rear wall 131, 141 and the guide wall 138, 148. The stroke of movement of the slider 50 is substantially equal to the width of the aperture 20. In the first position, the slider 50 opens the aperture 20 with its cutout 53 being in registry with the aperture 20 so that the gray-colored partition wall is viewed through the aperture 20. In the second position, the slider 50 closes the aperture 20 with its small-width portion outer surface so that the red-colored slider 50 is viewed through the aperture 20. The actuating protrusion 56 extends outward through the aperture 20 from the side surface of the slider small-width portion 52 near the rear edge thereof.

Figure 7A:
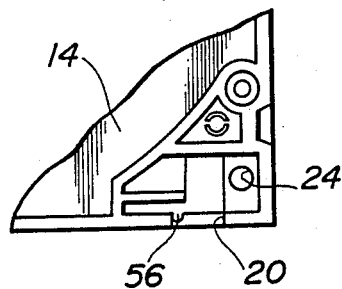
FIGS. 7A, 7B, and 7C contain three fragmentary views showing the erase prevention device of the invention as viewed in different directions with the slider being in the first position.
Figure 7B:
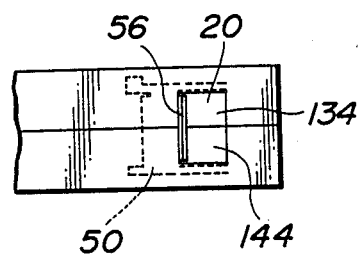
Figure 7C:
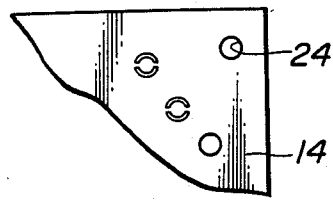

FIG. 7 shows the erase prevention device, as viewed in different directions, with the slider 50 being in the first position opening the coaxial holes 22 and 24 to open the inspection passage so as to inhibit operation of the video tape recorder/player unit in a recording mode. This position occurs when the slider 50 occupies its leftmost position, as shown in FIG. 7(A). In the first position, the slider 50 opens the aperture 20 with the cutout 53 being in registry with the aperture 20, as shown in FIG. 7(B), and opens the coaxial holes 22 and 24, as shown in FIG. 7(C). Therefore, the red-colored slider 30 can be viewed neither through the aperture 20 nor through the coaxial holes 22 and 24. Under this circumstance, it can be avoided for the user to consider, by mistake, that the cassette tape is allowed for use in recording.

Figure 8A:
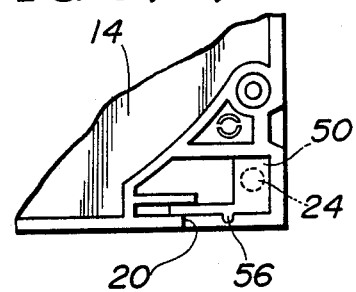
FIGS. 8A, 8B, and 8C contain three fragmentary views showing the erase prevention device of the invention as viewed in different directions with the slider being in the second position.
Figure 8B:
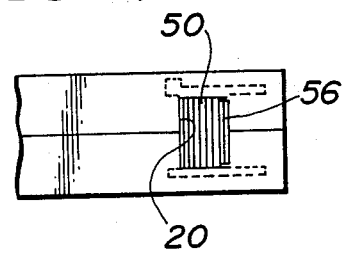
Figure 8C:
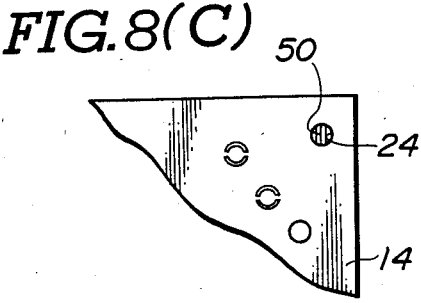

FIG. 8 shows the erase prevention device, as viewed in different directions, with the slider 50 being in the second position closing the coaxial holes 22 and 24 to interrupt the inspection passage so as to allow operation of the video tape recorder/player unit in a recording mode. This position occurs when the slider 50 occupies its rightmost position, as shown in FIG. 8(A). In the second position, the slider 50 closes both the aperture 20 with its small-width portion 52, as shown in FIG. 8(B), and the coaxial holes 22 and 24 with its upper and lower franges 54 and 55, respectively, as shown in FIG. 8(C). Therefore, the red-colored slider 30 can be viewed both through the aperture 20 and through the coaxial holes 22 and 24. Under this circumstance, it can be avoided for the user to consider, by mistake, that the cassette tape is inhibited for use in recording.

Figure 9:
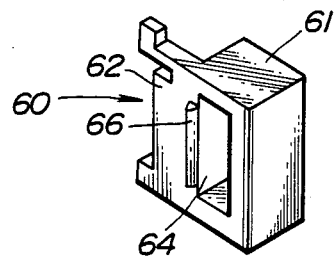
FIG. 9 is a perspective view showing a modified form of the slider of the invention.

Referring to FIG. 9, a modified form of the slider is shown. The slider, designated generally by the numeral 60, is substantially similar to the slider 50 of FIG. 6 except for that its large-width portion 61 is provided with a through-hole 64 extending in a direction substantially parallel to the axis of the aperture 20 to provide frame portions facing to each other. The slider 60 is placed for sliding movement within the slider chamber between first and second positions with its small-width portion 62 being held between the rear wall 131, 134 and the guide wall 138, 148. The stroke of movement of the slider 60 is substantially equal to the width of the aperture 20. When the slider 60 occupies the first position opening the coaxial holes 22 and 24, the slider 60 opens the aperture 20 with its through-hole 64 being in registry with the aperture 20 so that the gray-colored partition wall is viewed through the aperture 20. When the slider 60 occupies the second position closing the coaxial holes 22 and 24, the slider 60 closes the aperture 20 with its small-width portion outer surface so that the red-colored slider 60 is viewed through the aperture 20. The actuating protrusion 66 extends outward through the aperture 20 from the side surface of the slider small-width portion 62 adjacent to the rear edge thereof.

With this modification, therefore, it can be avoided for the user to consider, by mistake, that the cassette tape is allowed for use in recording data when the slider 60 occupies in the first position closing the coaxial holes 22 and 24 and that the cassette tape is inhibited for use in recording data when the slider 60 occupies the second position opening the coaxial holes 22 and 24.

While the device of this invention has been described above for use in conjunction with a recorder having an inspection probe for insertion through the inspection passage in determining the position of the slider, it will be appreciated that the inventive device is also equally applicable to other types of recorders including a recorder which determines the slider position by passing a light beam through the inspection passage.

While this invention has been described in conjunction with a specific embodiment thereof, it is evident that many alternatives, modifications and variations will be apparent to those skilled in the art. Accordingly, it is intended to embrace all alternatives, modifications and variations that fall within the scope of the appended claims.

What is claimed is:

1. An erase prevention device for use in a recording medium casing to selectively inhibit recording on a recording medium contained in said recording medium casing placed in a recorder, wherein said recording medium casing has a first color, comprising:
   coaxial holes formed in said recording medium casing to provide an inspection passage;
   a slider;
   means for guiding said slider in sliding movement in said recording medium casing between a first position and a second position, said slider having first and second portions and a second color different from said first color, said first portion of said slider opening said coaxial holes to open said inspection passage so as to inhibit operation of said recorder in a recording mode when said slider is in the first position, said first portion of said slider closing said coaxial holes to interrupt said inspection passage so as to allow operation of said recorder in a recording mode when said slider is in the second position; and
   an aperture formed in said recording medium casing for providing a visible indication that said recording medium can be used for recording operation, said second portion of said slider opening said aperture in the first position of said slider, said second portion of said slider closing said aperture in the second position of said slider,
   whereby said second color of said slider is substantially out of the view of a user through both said coaxial holes and said aperture when said slider is in the first position, and said second color is visible to a user through both said coaxial holes and said aperture when said slider is in the second position.

2. The erase prevention device as claimed in claim 1, wherein said first position is spaced from said second position.

3. The erase prevention device as claimed in claim 1, wherein said means for guiding comprises means for guiding said slider in a direction generally transverse to the direction of opening of said aperture.

4. The erase prevention device as claimed in claim 1, wherein said inspection passage has an axis, said aperture opening in a direction substantially perpendicular to the axis of said inspection passage.

5. The erase prevention device as claimed in claim 4, wherein said slider has a width, said slider having a portion provided therein with a cutout extending the full width of said slider in a direction substantially parallel to the direction of opening of said aperture to provide flanges facing to each other, said cutout being in registry with said aperture when said slider occupies the first position, said flanges closing said coaxial holes, respectively, when said slider occupies the second position.

6. The erase prevention device as claimed in claim 4, wherein said slider has a portion provided therein with a through-hole extending in a direction substantially parallel to the direction of opening of said aperture to provide frames facing toward each other, said through-hole being in registry with said aperture when said slider occupies the first position, said frames closing said coaxial holes, respectively, when said slider occupies the second position, said through-hole being surrounded by the portion in which said through-hole is provided.

* * * * *